US012002266B2

(12) United States Patent
Xu

(10) Patent No.: US 12,002,266 B2
(45) Date of Patent: Jun. 4, 2024

(54) GRAPH-BASED VIDEO INSTANCE SEGMENTATION

(71) Applicant: Adobe Inc., San Jose, CA (US)

(72) Inventor: Ning Xu, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 412 days.

(21) Appl. No.: 17/502,447

(22) Filed: Oct. 15, 2021

(65) Prior Publication Data

US 2023/0118401 A1     Apr. 20, 2023

(51) Int. Cl.
*G06V 20/40*     (2022.01)
*G06F 18/25*     (2023.01)
*G06N 3/08*     (2023.01)
*G06T 7/11*     (2017.01)

(52) U.S. Cl.
CPC ............ *G06V 20/49* (2022.01); *G06F 18/253* (2023.01); *G06N 3/08* (2013.01); *G06T 7/11* (2017.01); *G06V 20/46* (2022.01); *G06T 2207/10016* (2013.01)

(58) Field of Classification Search
CPC ........ G06V 20/49; G06V 20/46; G06V 10/44; G06V 10/82; G06F 18/253; G06N 3/08; G06N 3/045; G06T 7/11; G06T 2207/10016; G06T 7/162
See application file for complete search history.

(56) References Cited

U.S. PATENT DOCUMENTS

2021/0103742 A1* 4/2021 Adeli-Mosabbeb ... G06V 40/10
2022/0327720 A1* 10/2022 Verwoerd ............... G06T 7/593

OTHER PUBLICATIONS

Minghao Xu et al, ("Cross-domain Detection via Graph-induced Prototype Alignment", 2020 IEEE/CVF Conference on Computer Vision and Pattern Recognition (CVPR), pp. 5187-5196) (Year: 2020).*
Linjie et al, ("Video Instance Segmentation", 2019 IEEE/CVF International Conference on Computer Vision (Iccv), pp. 12352-12361) (Year: 2019).*
Yang et al ("Fast Appearance Modeling for Automatic Primary Video Object Segmentation", IEEE Transactions on image processing, vol. 25, No. 2, Feb. 2016) (Year: 2016).*

(Continued)

*Primary Examiner* — Amara Abdi
(74) *Attorney, Agent, or Firm* — Kilpatrick Townsend & Stockton LLP

(57) ABSTRACT

Certain aspects and features of this disclosure relate to graph-based video instance segmentation. In one example, a reference instance of an object in a reference frame and features in a target frame are identified and used to produce a graph of nodes and edges. Each node represents a feature in the target frame or the reference instance of the object in the reference frame. Each edge of the graph represents a spatiotemporal relationship between the feature in the target frame and the reference instance of the object. Embeddings of the nodes and edges of the graph are iteratively updated based on the spatiotemporal relationship between a feature in the target frame and the reference instance of the object in the reference frame, resulting in a fused node embedding that can be used for detecting the target instance of the object.

20 Claims, 6 Drawing Sheets

(56) References Cited

OTHER PUBLICATIONS

Wang et al, (Graph-Theoretic Post-Processing of Segmentation With Application to Dense Biofilms, IEEE Transactions on image processing, vol. 30, 2021) (Year: 2021).*

Athar et al., STEm-Seg: Spatio-Temporal Embeddings for Instance Segmentation in Videos, In European Conference on Computer Vision, Available Online at: https://arxiv.org/pdf/2003.08429.pdf, Aug. 18, 2020, pp. 1-28.

Bertasius et al., Classifying, Segmenting, and Tracking Object Instances in Video with Mask Propagation, In Proceedings of the IEEE/CVF Conference on Computer Vision and Pattern Recognition, Jun. 2020, pp. 9739-9748.

Bolya et al., YOLACT: Real-Time Instance Segmentation, In Proceedings of the IEEE/CVF International Conference on Computer Vision, 2019, pp. 9157-9166.

Braso et al., Learning a Neural Solver for Multiple Object Tracking, In Proceedings of the IEEE/CVF Conference on Computer Vision and Pattern Recognition, Jun. 2020, pp. 6247-6257.

Cao et al., SipMask: Spatial Information Preservation for Fast Image and Video Instance Segmentation, European Conference on Computer Vision, Jul. 29, 2020, pp. 1-17.

Chen et al., Relation R-CNN: A Graph Based Relation-Aware Network for Object Detection, IEEE Signal Processing Letters, vol. 27, Sep. 21, 2020, pp. 1680-1684, Abstract, pp. 1-3.

Dai et al., Deformable Convolutional Networks, In Proceedings of the IEEE International Conference on Computer Vision, 2017, pp. 764-773.

Gilmer et al., Neural Message Passing for Quantum Chemistry, ICML'17: Proceedings of the 34th International Conference on Machine Learning, vol. 70, Aug. 6, 2017, 10 pages.

Gori et al., A New Model for Learning in Graph Domains, In Proceedings. 2005 IEEE International Joint Conference on Neural Networks, vol. 2, Jul. 31-Aug. 4, 2005, 6 pages.

Hariharan et al., Simultaneous Detection and Segmentation, In European Conference on Computer Vision, Jul. 7, 2014, pp. 297-312.

He et al., Deep Residual Learning for Image Recognition, In Proceedings of the IEEE Conference on Computer Vision and Pattern Recognition, Jun. 2016, pp. 770-778.

He et al., Mask R-CNN, In Proceedings of the IEEE International Conference on Computer Vision, 2017, pp. 2961-2969.

Huang et al., Mask Scoring R-CNN, In Proceedings of the IEEE/CVF Conference on Computer Vision and Pattern Recognition, Jun. 2019, pp. 6409-6418.

Jiang et al., Graph Neural Based End-To-End Data Association Framework for Online Multiple-Object Tracking, Available Online at: arXiv preprint arXiv:1907.05315, Jul. 11, 2019, 12 pages.

Johnander et al., Learning Video Instance Segmentation with Recurrent Graph Neural Networks, Available Online at: https://arxiv.org/pdf/2012.03911.pdf, Dec. 7, 2020, pp. 1-13.

Li et al., Graph Networks for Multiple Object Tracking, In Proceedings of the IEEE/CVF Winter Conference on Applications of Computer Vision, 2020, pp. 719-728.

Luiten et al., Video Instance Segmentation 2019: A Winning Approach for Combined Detection, Segmentation, Classification and Tracking, In Proceedings of the IEEE/CVF International Conference on Computer Vision Workshops, Oct. 2019, 4 pages.

Milletari et al., V-Net: Fully Convolutional Neural Networks for Volumetric Medical Image Segmentation, In 2016 Fourth International Conference on 3D Vision (3DV), Jun. 15, 2016, pp. 1-11.

Oono et al., Graph Neural Networks Exponentially Lose Expressive Power for Node Classification, Published as a conference paper at ICLR 2020, Jan. 6, 2021, pp. 1-37.

Shi et al., Point-GNN: Graph Neural Network for 3d Object Detection in a Point Cloud, In Proceedings of the IEEE/CVF Conference on Computer Vision and Pattern Recognition, 2020, pp. 1711-1719.

Tian et al., Conditional Convolutions for Instance Segmentation, Accepted to Proc. European Conf. Computer Vision (ECCV) 2020 as Oral Presentation, Jul. 26, 2020, 18 pages.

Tian et al., FCOS: Fully Convolutional One-Stage Object Detection, In Proceedings of the IEEE/CVF International Conference on Computer Vision, 2019, pp. 9627-9636.

Voigtlaender et al., FEELVOS: Fast End-To-End Embedding Learning for Video Object Segmentation, In Proceedings of the IEEE/CVF Conference on Computer Vision and Pattern Recognition, Jun. 2019, pp. 9481-9490.

Wang et al., End-To-End Video Instance Segmentation with Transformers, Available Online at: arXiv preprint arXiv:2011.14503, Oct. 8, 2021, 10 pages.

Wang et al., PANet: Few-Shot Image Semantic Segmentation with Prototype Alignment, In Proceedings of the IEEE/CVF International Conference on Computer Vision, Aug. 2019, pp. 9197-9206.

Weng et al., GNN3DMOT: Graph Neural Network for 3D Multi-Object Tracking with Multi-Feature Learning, In Proceedings of the IEEE/CVF Conference on Computer Vision and Pattern Recognition, 2020, pp. 6499-6508.

Wojke et al., Simple Online and Realtime Tracking with a Deep Association Metric, In 2017 IEEE International Conference on Image Processing (ICIP), Mar. 21, 2017, 5 pages.

Xie et al., PolarMask: Single Shot Instance Segmentation with Polar Representation, In Proceedings of the IEEE/CVF Conference on Computer Vision and Pattern Recognition, 2020, pp. 12193-12202.

Xu et al., Cross-Domain Detection via Graph-Induced Prototype Alignment, Institute of Electrical and Electronics Engineers/CVF Conference on Computer Vision and Pattern Recognition (CVPR), Jun. 13-19, 2020, pp. 12355-12364.

Yang et al., Efficient Video Object Segmentation via Network Modulation, In IEEE Conference on Computer Vision and Pattern Recognition (CVPR), Jun. 2018, pp. 6499-6507.

Yang et al., Video Instance Segmentation, Institute of Electrical and Electronics Engineers/CVF International Conference on Computer Vision (ICCV), Oct. 27-Nov. 2, 2019, pp. 5188-5197.

Zhou et al., Objects as Points, Available Online at : https://arxiv.org/pdf/1904.07850.pdf, Apr. 25, 2019, pp. 1-12.

Zhou et al., Tracking Objects as Points, In European Conference on Computer Vision, Available Online at: https://arxiv.org/pdf/2004.01177.pdf, Aug. 21, 2020, 22 pages.

* cited by examiner

GRAPH-BASED VIDEO INSTANCE SEGMENTATION

TECHNICAL FIELD

The present disclosure generally relates to the field of digital video processing. More specifically, but not by way of limitation, the present disclosure relates to processing techniques for efficiently detecting and tracking instances of objects across video frames of video clips.

BACKGROUND

Although certain existing solutions exist to assist videographers in identifying and/or masking objects appearing in multiple frames of a video clip, the process can be tedious. Some media editing applications require the user to not only identify an object in multiple frames, but also input information regarding the path of the object across frames in order to produce the most accurate results. The more precision required, the more information and input the user must provide.

Some more recent video editing solutions can provide some level of programmatic video instance segmentation (VIS). VIS is the determination of the edges or extent of an instance of an object or a mask that encompasses the object in a video clip in order to allow the creation of layers and/or the application of filters directed to the object. One VIS technique attempts to predict an object's instance on a frame-by-frame basis and then associate instances across frames, relying on similarity metrics to identify the position and extent of the object. Another VIS technique attempts to predict clip-level instance masks by propagating the masks from a central frame across a video clip. These techniques use multiple independent algorithms to detect and segment instances of objects, resulting in a resource intensive application that requires significant processing power and memory to produce accurate results.

SUMMARY

Certain aspects and features of the present disclosure relate to graph-based video instance segmentation. For example, a computer-implemented method involves identifying a reference instance of an object in a feature domain of a reference frame of a media clip. The method further involves identifying features in a target frame of the media clip in the feature domain. The method involves producing a graph of nodes and edges based on the reference instance of the object in the reference frame and the features in the target frame. Each node of the graph represents a feature in the target frame or the reference instance of the object in the reference frame. Each edge of the graph represents a spatiotemporal relationship between the feature in the target frame and the reference instance of the object in the reference frame. The method further involves iteratively updating embeddings of the nodes and edges of the graph based on the spatiotemporal relationship between features in the target frame and the reference instance of the object in the reference frame. Fused node embeddings are used for detecting a target instance of the object in the target frame. The method can include displaying the target instance of the object as visually segmented from the target frame.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
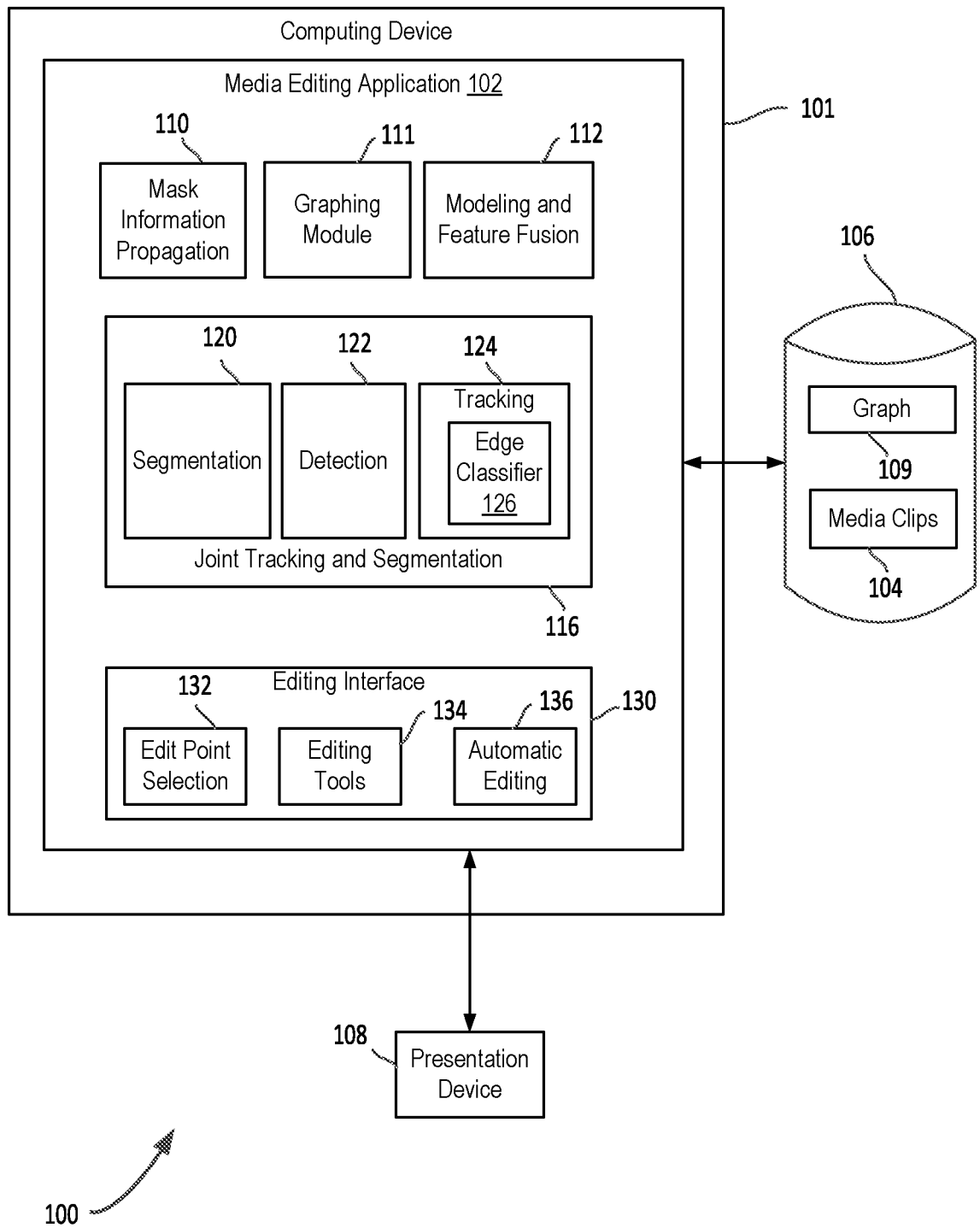
FIG. 1 is a diagram showing an example of a computing environment for graph-based video instance segmentation, according to certain embodiments.

As described above, some existing solutions for segmenting instances of objects in media clips provide mechanisms to obtain accurate results with extensive user input. Other existing solutions provide more automated video instance segmentation (VIS), but require significant computing resources, making such solutions impractical for use on some computer systems. Embodiments herein provide accurate, automated VIS by using one or more models to identify features in one frame (e.g., a frame of raw or source video, or a photo) from a media clip and the relationship of those features to an instance of the object in another frame (a reference frame). These relationships can then be used to detect and segment an instance of the object in the source frame in a computationally efficient manner.

VIS includes detection of an object in a frame and "segmentation" of the object, which is the determination of the edges or extent of the object or a mask that encompasses the object in the frame. Segmentation can allow the creation of layers and/or the application of filters directed to the object. Embodiments herein produce a graph data structure in which graph nodes represent features in a target frame (also referred to as a source frame) that correspond to candidate instances of an object and graph edges represent spatiotemporal relationships between the features in the target frame and the instance of the object in a reference frame. The graph is iteratively updated to produce one or more fused node features or embeddings and updated edge embeddings, which can in turn be used by a tracking and segmentation module to detect and segment the instance of the object in the target frame. The target frame, once the object has been segmented, can be used as a subsequent reference from, or the reference frame for a subsequent target frame of source video, allowing a media editing application to quickly work through consecutive frames until the object has been segmented across a media clip or a desired portion of a media clip.

The following non-limiting examples are provided to introduce certain embodiments. Consider a user who wishes to apply a filter to the face of an individual in a media clip. The filter may be, as examples, used to blur the face, or used to improve the brightness or dynamic range of apparent lighting of the face. The user can select one instance of the face in one frame (the first reference frame), and the media editing application can use VIS as described herein to identify and segment the face in a subsequent frame and determine the outline of the filter's effect in the subsequent video frame so that the desired filter is only applied to the "face" portion of the frames. Each time the media editing application segments the face in a frame, that frame becomes the reference frame for the next frame, which is a new target frame. That target frame in turn becomes the next reference frame, etc., until the filter is applied over an entire clip or a desired portion of a clip.

As another example, the user of a media editing application can identify an instance of an individual or some other moving object in the first reference frame, and the media editing application can use VIS as described herein to automatically identify and segment the moving object over many frames, creating a layer of the moving object that can be applied to any suitable video background layer, effectively placing the moving object in a different moving or stationary background. A media editing application can allow the segmentation of more than one object at the same time in the same media clip. In other examples, the instance(s) of the object(s) in the initial reference frame can be automatically identified and segmented using object detection and segmentation algorithms.

Continuing with the above example, at various points in the process, an editing interface of the media editing application can display the mask of the object on a presentation device along with a frame of the media clip, or over a segment of the media clip. Alternatively, or in addition, a bounding box can be displayed to highlight to the user the detection of an object by the VIS feature of the media editing application. The user can use such display elements to verify or confirm identification or segmentation of the desired object.

Certain embodiments provide improvements over existing techniques for video instance segmentation. For example, one or more models within a media editing application can be used to identify an instance of an object in a reference frame and features in a target frame of the media clip. The media editing application can produce the graph of nodes for the features and edges linking the features to the reference instance of the object. An edge represents a relationship between the feature in the target frame and the reference instance of the object. The graph can be iteratively updated to produce a more limited set of nodes and correspondingly updated edges and these can be used to identify the instance of the object in another frame of the media clip accurately and efficiently. A model can be trained using instances of sample of objects from pre-existing media clips and labels for the sample objects. The model can be retrained over time and distributed with updates to the media editing application.

Previous VIS techniques handle tracking and detection independently, without using shared information for these two subtasks of the process, reducing accuracy and increasing computational complexity. For example, one framework may be used for tracking-by-detection, with candidate instances provided for independent classification and re-identification. Certain embodiments herein share information among different subtasks, reducing memory requirements. For example, the graph used in the tracking and detection can enable information shared among different subtasks. Graph nodes can represent instance features used for detection and segmentation and graph edges representing instance relations are used for tracking. Both inter and intra-frame information is propagated and shared via graph updates and all the subtasks (i.e., detection, segmentation and tracking) are jointly optimized in an unified framework. The ability in some embodiments to provide accurate results using a limited set of nodes further reduces computational costs. For example, graph edges that do not connect the identified instance features are pruned to reduce the computational costs and to eliminate interference to the tracking subtasks.

FIG. 1 is a diagram showing an example of a computing environment for graph-based video instance segmentation, according to certain embodiments. The computing environment 100 includes a computing device 101 that executes a media editing application 102, a memory device 106 configured to store one or more media clips 104, and a presentation device 108 that is controlled based on the media editing application 102. Memory device 106 may also include a stored feature instance graph 109, a data structure for use in identifying instances of objects in a frame of a media clip. In this example, the media editing application 102 includes a history and mask information propagation module 110, as well as a graphing module 111, and a modeling and graph feature fusion module 112. The modeling and feature fusion module 112 can iteratively update the stored feature instance graph 109 to combine or "fuse" features into fused node features that can be used for detection and segmentation. The media editing application 102 also includes joint tracking and segmentation module 116, which provides tracking result, object detection results, and segmentation results (the object's edges or the object's mask). An object's mask can be displayed on the presentation device 108. Alternatively, the objects identification can be indicated with a bounding box on the presentation device 108. The joint tracking and segmentation module 116 further includes a segmentation module 120, and a detection module 122, and a tracking module 124. Tracking module 124 further includes an edge classifier 126 to enable efficient detection of edges that allow instances of the objects to be segmented or masked relative to the backgrounds of video frames. The edge classifier 126 separates (classifies) edges based on which objects in the frame an edge is associated with.

The media editing application 102 also generates a media editing interface 130. In some embodiments, the media editing application 102 uses inputs related to edit point selection 132 and editing tools 134 received via the media editing interface 130 to control one or more operations of the media editing application 102. In some embodiments, the media editing application 102 edits media clips automatically when automatic editing 136 is selected in the media editing interface 130. Automatic editing may include assembling video clips and/or still images into a finished media presentation. Automatic editing may also include using VIS as described herein to identify an instance of an object against a background in a media clip and provide detection and segmentation across multiple video frames to enable a mask that can be used to apply the object to other media clips. As examples, a background can be a complex realworld background, or a background may include only a single color such as a background resulting from the use of a "green screen."

The media editing application 102 provides the editing interface 130 for display at a presentation device 108, which can be a local presentation device or a computing device that is remotely accessible over a data network. The media editing application includes one or more software modules (not shown) that render content for display in an editing interface 130. This content can include a current frame, a playing media clip, or a media presentation displayed in a video window. The content can also include thumbnail images, edit points, and editing controls. The media editing application may be a traditional editing application that provides cutting, splicing, masks, color balancing, etc., as would typically be used in editing movies and videos for presentation. Alternatively, the media editing application may be one that is specialized to highlight video features, as might be used in a news or sports telecast. The media editing application can also be one that is used in premises security to analyze security video. The media application may have many or few user controls and may be designed for general use or for a specific purpose.

Figure 2:
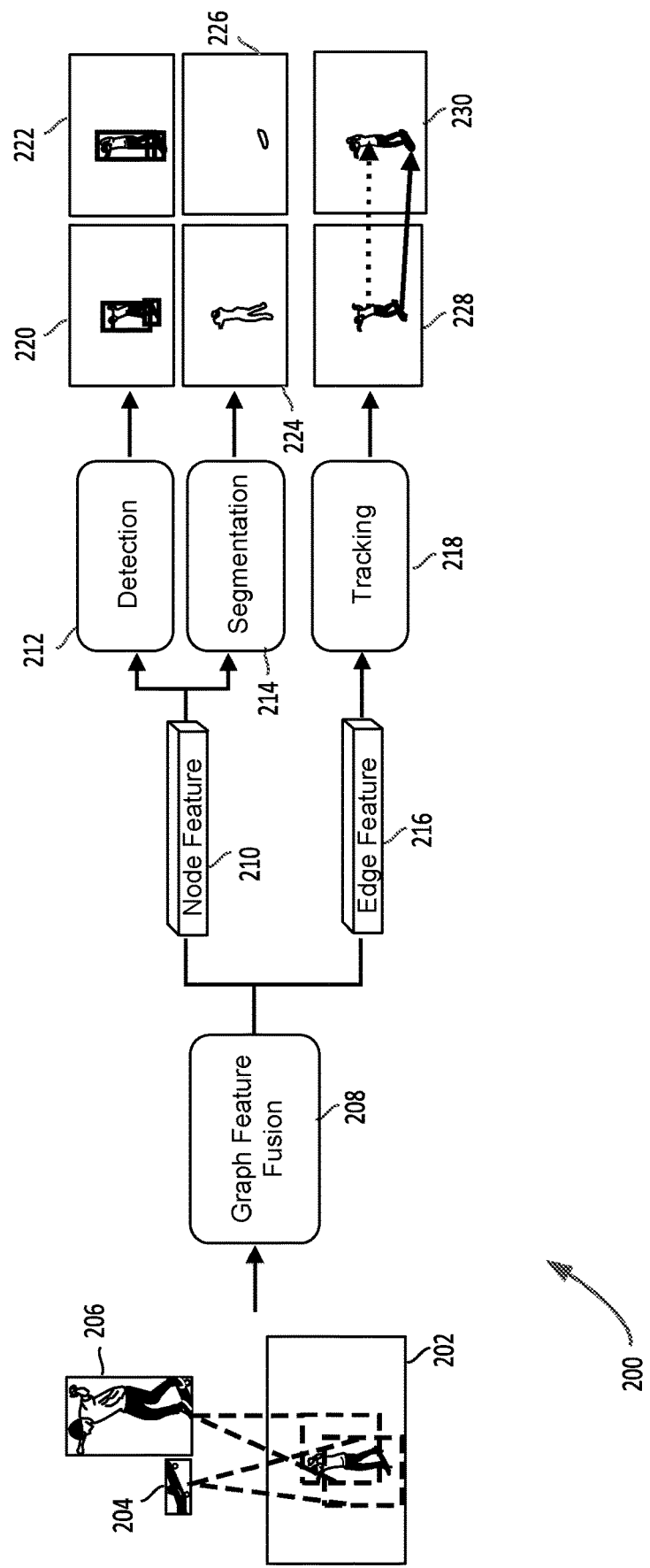
FIG. 2 is an entity flow diagram illustrating an example of object instance segmentation, according to certain embodiments.

FIG. 2 shows a data flow diagram 200 illustrating an example of object instance segmentation, according to certain embodiments. In this example, frame 202 is a target frame and the skateboard object 204 and the rider object 206 are the detected objects from a reference frame. The target frame 202 also depicts the skateboarding, and contains instances of the skateboard object 204 and the rider object 206, which can be detected and segmented using the technology presented herein. In diagram 200, graphs are used to model the instance level relationships between an instance in a reference frame and features in a target frame. Features in the target frame 202 that may correspond to an instance of an object such as skateboard 204 or rider 206 are represented by nodes in the graph, while spatiotemporal relationships between the instances in the reference frame and the features in the target frame are represented by edges in the graph. Each node and each edge has embeddings or features associated therewith. The embeddings or features of a node can be generated using one or more models based on the corresponding frames. The embeddings or features of an edge can be generated based on the embeddings of the nodes. Graph feature fusion 208 is used to fuse the features of the nodes and edges of the graph to provide a node feature 210 that can be used for detection 212 and segmentation 214. Graph feature fusion 208 also provides an edge feature 216 that can be used to identify edges and provide tracking 218. The node feature 210 and edge feature 216 are provided simultaneously, or near simultaneously, and allow detection 212, segmentation 214, and tracking 218 to be accomplished together, maintaining a connection between these operations and providing for high computational efficiency. Object detection can be used to highlight objects in a displayed video frame without precise edge detection, such as by bounding boxes as indicated in consecutive frames 220 and 222. Segmentation can be used to provide a mask such as mask 224 of the rider and mask 226 for the skateboard. Tracking 218, based on edge feature 216, can quickly identify object instances in multiple frames even when the object(s) move across frames such as is shown in frame 228 and frame 230.

Figure 3:
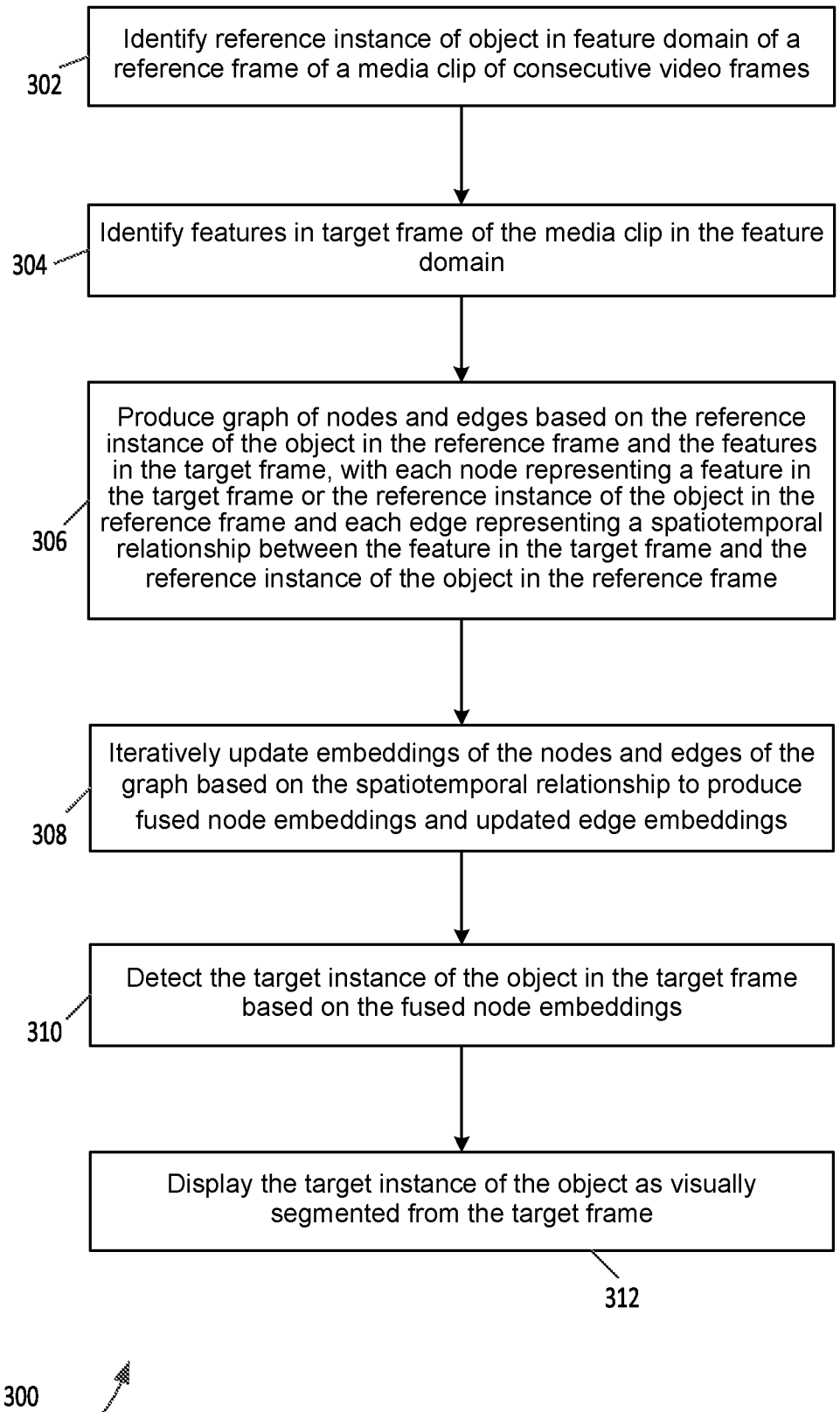
FIG. 3 is a flowchart of an example of a process for graph-based video instance segmentation, according to some embodiments.

FIG. 3 is a flowchart depicting an example of a process 300 for graph-based video instance segmentation. In this example, a computing device carries out the process by executing suitable program code, for example, computer program code for a media editing application such as media editing application 102. At block 302, the computing device identifies a reference instance of an object in a feature domain in a reference frame of the media clip. Since the reference instance of the object in the reference frame is known, the features in the feature domain that correspond to the object can be identified, such as based on the location of the reference instance of the object in the reference frame. A media clip typically contains a number of consecutive video frames. A media clip may also contain still images or graphics. At block 304, the computing device identifies features in a target frame of the media clip in the feature domain. The target frame, as an example, may be a frame of unprocessed video, typically the next frame in a series of frames being processed by the media editing application. The feature domain includes image frames from the media clip in which instances of an object of interest may occur or be present. In the feature domain, frames are analyzed for features which may correspond to instances of an object of interest.

At block 306 of process 300, the computing device produces a graph of nodes and edges based on the reference instance of the object in the reference frame and the features in the target frame. Each node of the graph represents a feature in the target frame or the reference instance of the object in the reference frame. Each edge of the graph represents a spatiotemporal relationship between the feature in the target frame and the reference instance of the object in the reference frame. At block 308, the computing device iteratively updates embeddings of the nodes and edges of the graph by following the spatiotemporal relationship between nodes to produce fused node embeddings and updated edge embeddings. Additional details about the iterative updating is provided below with respect to FIG. 4. The functions included in block 306 and discussed with respect to FIG. 4 can be used in implementing a step for producing a graph of nodes and edges based on the reference instance of the object in the reference frame and the features in the target frame. The functions included in block 308 and discussed with respect to FIG. 4 can be used to implement a step for iteratively updating embeddings of the nodes and edges of the graph based on a spatiotemporal relationship between a feature in the target frame and the reference instance of the object in the reference frame to produce fused node embeddings and updated edge embeddings.

Still referring to FIG. 3, at block 310, the computing device detects the target instance of the object in the target frame based on the fused node embeddings. At block 312, the computing device may display the target instance of the object as visually segmented from the target frame. As an example, this visually segmented display may be made on presentation device 108. The display of the object may be with highlighting, masking, bounding boxes, color inversion, rendered graphical information such as pointers or text, or any other display technique that can be perceived by a typical user of the media editing application. In other examples, the identified instance of the object in the target frame may be automatically processed based on settings. For instance, if a filter has been set up for the object, the identified instance of the object can be filtered using the filter to generate a modified version of the target frame with the object being filtered. In another example, the identified instance of the object can be extracted from the target frame to generate a new frame with or without combining with other content, such as other objects or a different background. Other types of processing the identified instance of object may be performed.

Process 300 can provide for simultaneous detection and segmentation, and associate instances of an object in a unified framework. A software module that handles detection and segmentation together reduces computational steps and provides for more efficient and faster segmentation. Such processing can leverage useful inter-frame and intra-frame features, based on a model that graphically represents instance-level, spatiotemporal relationships. A feature map of the target frame is aggregated with instance features of a reference frame. Each target frame, once processed, can serve as the reference frame for the next frame in a media clip. After iterating and updating the graph, aggregated node features of the target frame can be used to predict detection and segmentation results, while edge features can be used to predict tracking results. In addition, to better leverage the mask predictions of previous frames, an additional software module can be used to warp mask information such as the instance-sensitive mask filters of previous frame(s) to the current target frame to obtain more accurate mask prediction.

Figure 4:
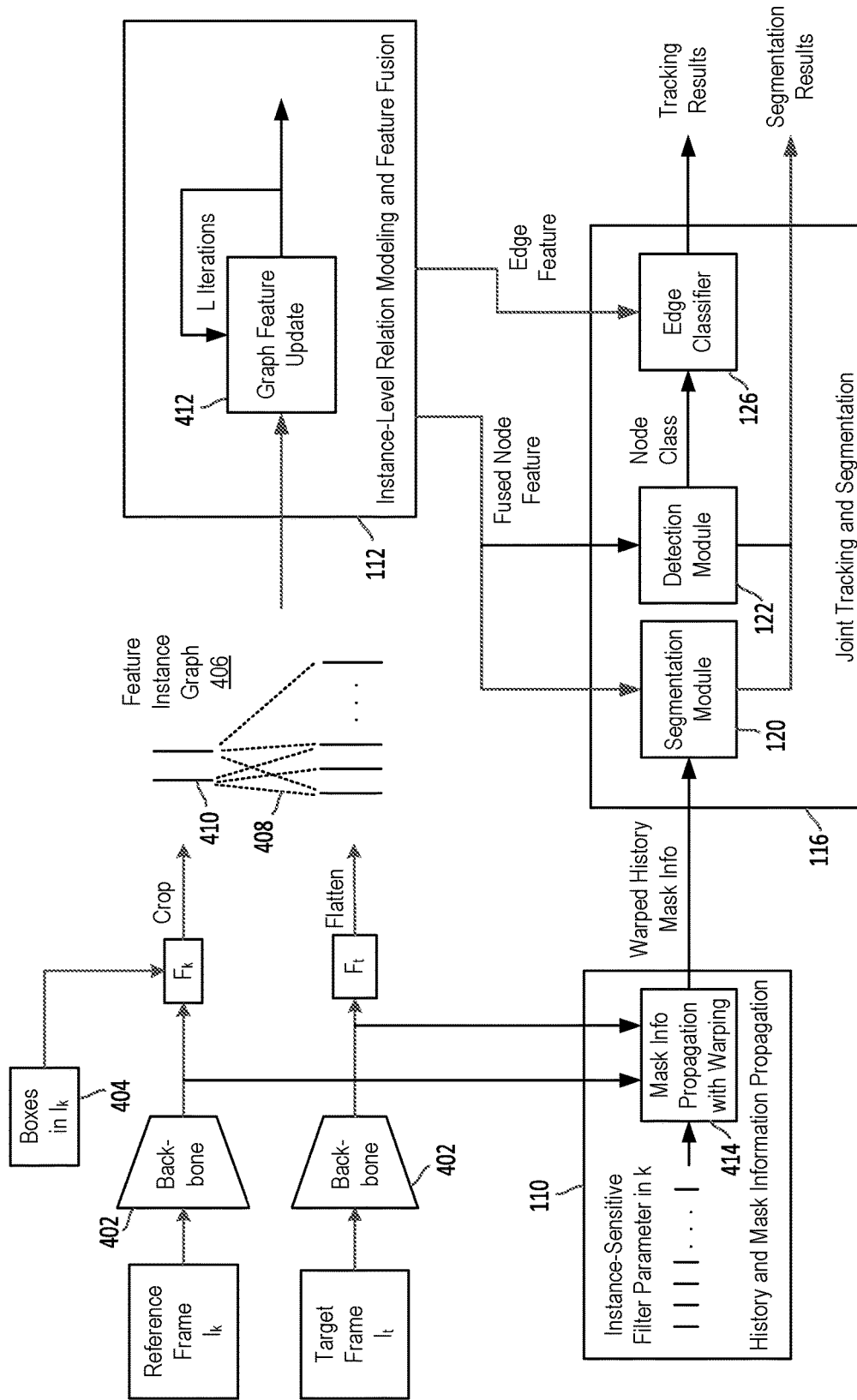
FIG. 4 is an example of a block diagram of a framework that can provide graph-based video instance segmentation, according to certain embodiments.

FIG. 4 is a schematic illustration of an example of a software system 400 that can provide graph-based video instance segmentation, according to certain embodiments. Reference frame k, denoted as $I_k$ in pixel domain, in system 400 is an image where the location of one or more instances of objects has already been determined or predicted. For example, the frame $I_k$ may include the rider and skateboard as shown in FIG. 2. The reference frame $I_k$ is transformed into a feature domain by one or more backbone neural network modules 402 to obtain the corresponding feature frame $F_k$. Target frame t, denoted as $I_t$ in the pixel domain, may include instances of these same objects. The target frame $I_t$ is also transformed into the feature domain by the backbone neural network module 402 to obtain the corresponding feature frame $F_t$. Active bounding boxes 404 are used to limit the portions of feature frame $F_k$ to be used to the portions of the frame where the objects of interest occur. The feature frame $F_k$ of reference frame $I_k$ is then cropped so that the features extracted from feature frame $F_k$ are limited to features that correspond to the instances of object(s) of interest.

Feature frame $F_t$ of the target frame $I_t$ generated by backbone neural network modules 402 of system 400 are flattened For example, each point of a feature can be represented by a 3D tensor, for example, a 7×7×5 tensor. The feature in this example can thus be described by only 49 points, again, providing for computational efficiency. The cropped or flatten features are used by the graphing module 111 to build a data structure for a feature instance graph 406. The graph includes nodes 408 and edges 410. Each node represents a feature in the target frame or the reference instance of the object in the reference frame, and each edge represents a spatiotemporal relationship between nodes.

In one example, feature instance graph 406 can be denoted as G(V,E) including a node set V and an edge set E. The node definition is different for frames k and t since for frame k, the instance candidates are known while for frame t they are not. Therefore, for frame k, each instance candidate is defined as a node. The node feature is defined as the cropped feature from $F_k$ by region-of-interest alignment and further downsampled and flattened to a D-dimensional feature vector. For frame t, each pixel location (x,y) of $F_t$ is defined as a node and $F_t(x,y) \in R^D$ as its node feature. Despite the different definition, $h_i^v$ can be used to denote the feature of node i in set V.

In this example, for graph 406, an edge $e_{ij}$ in set E represents an undirected connection between node i and node j. Then, $h_{ij}^e$ denotes the edge feature, which is initialized as $|h_i^v - h_j^v|$. The resulting graph can be sparsely connected by enforcing one or more constraints. For instance, a constraint can be imposed by connecting only nodes across frames. This helps to reduce the number of edges in the graph. Additionally, or alternatively, for an instance node at frame k whose center is (x,y), the node can be only connected to the nodes at frame t whose distances to (x,y) are smaller than a selected threshold (e.g., a W×W window around the center). These constraints again minimize both memory and processing resources used. They result in edge features being used to predict tracking results and thus only cross-frame edges are meaningful. Additionally, the displacement of an instance between nearby frames will usually be local. Also, although the graph only has inter-frame connections, the iterative graph updates discussed below can still aggregate useful intra-frame features into a fused feature map.

Continuing with FIG. 4, module 112 provides instance level relation modeling and feature fusion. Module 112 includes a feature update process 412, which fuses features from the two frames over a selected number of iterations according to the spatiotemporal relationships between nodes. Features of the reference frame k compliment features of the target frame i. Features of the reference frame k propagate towards edges with each iteration. At each iteration, the node and edge features are propagated and updated by first updating edge features, each by its two endpoints and then then updating node features, each by its connected edges. This process can be represented by:

$$h_{ij}^{e(l)} = N_e([h_{ij}^{e(l-1)}, h_i^{v(l-1)}, h_j^{v(l-1)}]) \quad (1)$$

$$h_i^{v(l)} = \sum_{j|e_{ij} \in E} N_v([h_{ij}^{e(l)}, h_i^{v(l-1)}]) \quad (2)$$

where $N_e$, and $N_v$, denote two learnable functions which are two multilayer perceptions (MLP), and [.] denotes the concatenation operation. After the total L iterations, the updated node features at frame t are reshaped to R H×W×D to create the aggregated feature $\hat{F}_t$, which can be used to predict detection and segmentation results, while the updated edge features will be used to predict tracking results.

Detection module 122 can include an aggregated spatiotemporal feature map $\hat{F}_t$. As one non-limiting example, CenterNet can be used for anchor-free image detection to predict object categories and locations by finding their center points and bounding box sizes. In one example, $\hat{F}_t$ is fed into a three-convolutional head (e.g., three-convolutional neural network output branch, potentially sharing a backbone network with other output branches) to obtain a location heat map, size map and coordinate-refinement map. The location heat map estimates instance center points and their categories. The size map estimates bounding box sizes. The refinement map helps refine the locations of center points. The loss of the detection branch follows the loss in CenterNet, which includes the center-point loss, size loss, and offset loss, as indicated by:

$$L_{det} = L_{center} + \lambda_{size} L_{size} + \lambda_{offset} L_{offset} \quad (3)$$

where $\lambda_{size}$ and $\lambda_{offset}$ balance the three losses.

Segmentation module 120 in the example of FIG. 4 also includes a controller head to predict instance-sensitive convolution filters $\theta_t \in R^{H \times W \times D}$. The convolution filter $\theta_t(x,y) \in R^D$ at an instance location (x,y) can then be used as the 1×1 convolution kernels in the mask head (i.e., to provide a fully-convolutional network (FCN)) to predict the corresponding instance. This controller head leverages the spatiotemporal features $\hat{F}_t$, which contains richer information than that of a single frame.

In this example, instance-sensitive kernels $\theta_k$ at the reference frame k, which represent historical instance mask and shape information are available to refine the segmentation results at frame t. Therefore, a module to warp θk to the current frame based on the feature differences of the two frames can be used. Specifically, given the two feature maps $F_k$ and $F_t$, their difference can be provided to a convolutional neural network (CNN) to estimate a group of offsets. The offsets can be reshaped to two 3×3 filters for the x and y axes and then used as deformable convolution parameters. The input of the deformable convolution is θk while the output is the warped kernels $\theta_{warp}$ for the current frame. The final instance-sensitive kernels $\theta_t$ for frame t are each the sum of the two kernels $\theta_t$ and $\theta_{warp}$.

The mask information and propagation module 414 in this example includes warping. The warping in module 414 operates at the feature level. Module 414 of FIG. 4 also warps all instance filters. Finally, to predict an instance mask at location (x,y), the mask head used with system 400 takes, as inputs, the merged instance-sensitive kernel $\hat{\theta}_t(x,y)$, the spatiotemporal feature map $\hat{F}_t$, and the position encoding map $P_{x,y}$ as follows:

$$M_{x,y} = \text{MaskHead}([\hat{F}_t^d, P_{x,y}]; \hat{\theta}_t(x,y)) \qquad (4)$$

where [.] denotes the concatenate operation, and $\hat{F}_t^d$ is generated from $\hat{F}_t$ by 1×1 convolution to reduce the channel dimension to eight. $P_{(x,y)}$ is a two-channel (x and y) position map, which encodes the relative x-axis and y-axis offsets from (x,y) to the other locations. The loss function for the segmentation branch L mask is the dice loss between predicted instance masks and ground truth masks. Segmentation module 120 leverages two types of spatiotemporal information, i.e., both the aggregated semantic feature via a neural network and the historical shape-related kernels from the previous frame.

History and mask information propagation module 110 retains the history of the mask information per segmented instance. Module 110 uses mask information propagation module 414 to produce filtered information from previous segmentations of a feature and use this information to improve accuracy of segmentation. The previous segmentation masks can be filtered using instance-sensitive filter parameters determined from the reference frame k. If there is more than one object being segmented each will have its own filter parameters. Mask information propagation module 414 warps the historical mask information so that low-level instance shape information from the reference frame fits the target frame. Module 414 can use deformable convolution to warp previous instance convolution kernels and fuse them with those predicted in order to obtain filter parameters Tracking module 124 of FIG. 1 uses graph edges to associate existing tracks or initialize new tracks, and the edge density of the graph can initially be very high. The tracking module can also categorize edges. For example, many graph nodes at frame t can be categorized as background by detection module 122, so that corresponding edges can be removed prior to the tracking prediction. Moreover, some graph nodes at frame t correspond to class predictions that are different than those of their connected graph nodes at frame k. These edges have no use since no instance can change its class. Therefore, these types of edges are removed from the graph. The remaining edges correspond to the object center and are stored for tracking prediction. Specifically, for each remaining edge $e_{ij}$, its final edge feature $h_{ij}^{e(L)}$ is provided to binary edge classifier 126 of tracking module 124 to predict the object-association relationship between node i at frame k and node j at frame t. A positive prediction indicates the two nodes belong to the same instance and vice versa. Therefore the loss for the tracking module can be defined as:

$$L_{edge} = \frac{-1}{|E_{prune}|} \sum_{e_{ij} \in E_{prune}} y_{ij} \log(\hat{y}_{ij}) + (1 - y_{ij})\log(1 - \hat{y}_{ij}) \qquad (5)$$

where $\hat{y}_{ij}$ is the prediction for edge $e_{ij}$ and $E_{prune}$ denotes the pruned edge set after removing the redundant edges. A positive prediction indicates that the node j is the extension of node i in the current frame and thus should be associated to the same track. If an instance of frame t is not matched to any existing sequence after edge classification, a new track based on this instance will be initialized.

Figure 5:
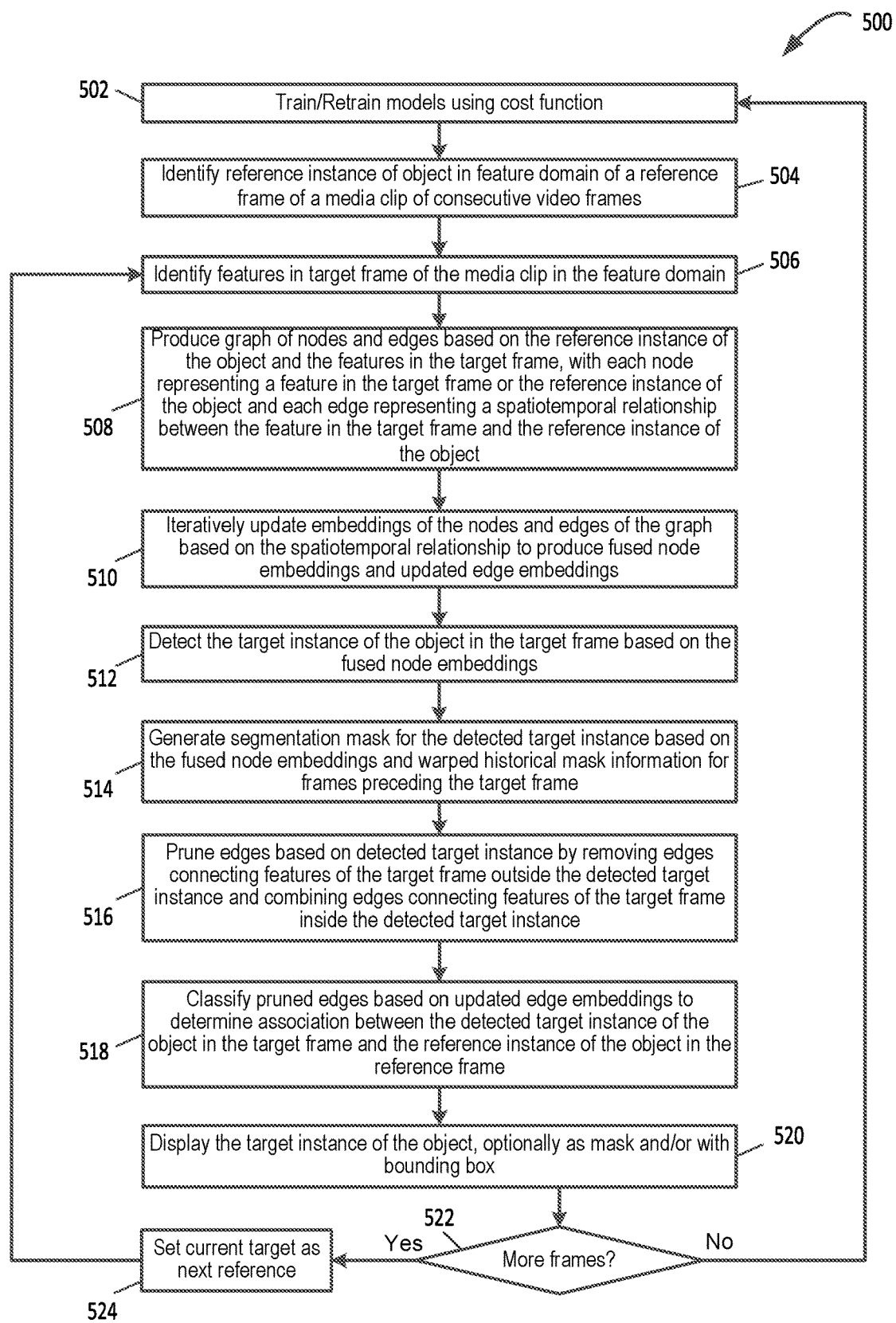
FIG. 5 is a flowchart of another example of a process for graph-based video instance segmentation, according to some embodiments.

FIG. 5 is a flowchart depicting an example of a process 500 for graph-based video instance segmentation. In this example, a computing device carries out the process by executing suitable program code, for example, computer program code for a media editing application such as media editing application 102. At block 502, the models used for video instance segmentation are trained using a cost function. For example, two frames from any video sequence can be randomly selected as a reference and target frame for training purposes. Ideally, the time difference between these two frames in the video sequence should be less than five seconds. Ground truth detections of features in the reference frame can be used to produce nodes. The controller head can be used to obtain instance sensitive convolution filters for the reference frame. The total loss function for the models can be written as:

$$L_{total} = \lambda_1 L_{det} + \lambda_2 L_{mask} + \lambda_3 L_{edge} \qquad (6)$$

The loss function is applied to the target frame, while the loss function and the segmentation loss $L_{mask}$ are applied to the reference frame. In practical application, the models may be trained prior to distribution of media editing software that implements the features and aspects described herein. Retraining can take place as the software is used, or through software updates.

Once the models are trained (or retrained), the media clip of interest can be segmented. At block 504 of process 500, a reference instance of an object in the feature domain of a reference frame of the media clip of consecutive frames is identified. At block 506, features in the target frame of the media clip, in the feature domain, are identified. At block 508, the computing system running the media editing application produces a graph of nodes and edges based on the reference instance of the object and the features and the target frame, with each node representing a feature in the target frame or the reference instance of the object. Each edge represents a spatiotemporal relationship between the feature in the target frame and the reference instance of the object.

Still referring to FIG. 5, at block 510, the computing system iteratively updates embeddings of the nodes and edges of the graph based on the spatiotemporal relationship to produce fused note embeddings and updated edge embeddings. As long as the graph update iterations L≥2, the updated node and edge features will include both inter-frame and intra-frame features even when the graph has no intra-frame connections. A node will receive the information of its nearby nodes for the same frame after a connected common node for a feature of the other frame aggregates all the information for the two frames. The graph can therefore be sparsely connected and, again, requires less computational resources while still managing to extract useful spatiotemporal features.

At block 512 of process 500, the computing device detects the target instance of the object in the target frame based on fused node embeddings. At block 514, the computing device generates a segmentation mask for the detected target instance based on the fused node embeddings and historical warped mask information for frames preceding the target frame. Module 414 of FIG. 4 uses deformable convolution to warp historical instance convolution kernels and fuse them with those predicted by the controller head to obtain final instance-sensitive filter parameters.

At block 516 of process 500, edges of the graph are pruned based on the detected target instance by removing edges connecting features of the target frame outside the detected target instance and combining edges connecting features of the target frame inside the detected target instance. At block 518, pruned edges are classified based on updated edge embeddings to determine the object-based association between the detected target instance of the object in the target frame and the reference instance of the object in the reference frame. A positive prediction indicates the two nodes belong to the same instance and vice versa. For example, a positive prediction can indicate that the one node is the extension of another node in the current frame and thus should be associated with the same track. The target instance of the object can be displayed at block 520. The target instance can be displayed as a mask, by displaying a bounding box around the object, or both. The functions of detecting the target instance of the object in the target frame, segmenting the target object, for example by generating the segmentation mask using warped historical mask information, classifying edges based on updated edge embeddings, and tracking the target instance of the object as discussed above can be used to implement a step for identifying the target instance of the object in the target frame based on the fused node embeddings.

At block 522 of process 500, the computing device makes a determination as to whether more frames remain to process. This determination can be made with or without user input. If there are no more frames to process, meaning the entire media clip, an automatically-selected portion of the media clip, or a user-selected portion of the media clip has been analyzed, processing returns to block 502 for retraining of the models used in segmentation. This retraining may take place immediately, or processing may stop and the retraining may take place in the future. It is also possible to process additional media clips without retraining. If there are more frames to process at block 522, the current target frame is set as the next reference frame at block 524, and processing returns to block 506, where features are identified in the next consecutive frame, which is treated as the target frame.

Given a video sequence, the method described above processes a pair of frames $I_{t-1}$ (reference frame) and $I_t$ (target frame) iteratively until the end of the video sequence. For the first frame, since there is no reference frame, the detection and segmentation modules can be used with no spatiotemporal features or kernel warping to obtain initial instance predictions. The full tracking results can be obtained by connecting the tracking prediction of pairs of frames. The frames of a pair being processed may or may not occur consecutively within the media clip of interest. However, it is possible that an instance in the reference frame $I_{t-1}$ is not matched to any instances in the current (target) frame $I_t$, indicating that the instance is occluded in $I_t$. In such a case, the unmatched instance identity can be connected with its cropped node feature $h_t^v$ as well as its instance-sensitive convolution filters $\theta_{t-1}(x,y)$ in memory. When proceeding to the next pair of frames $I_t$ and $I_{t-1}$, the unmatched node feature can be added as an existing instance node at frame t and the convolution filters of the newly estimated reference frame $\theta_t(x,y)$ can be replaced with $\theta_{t-1}(x,y)$, since an instance displacement within a short time interval $\Delta t$ is usually small. To make the assumption hold, only the unmatched instance is retained in memory within the time interval $\Delta t$, which can be set either by being programmatically coded in the media editing application or by user input. In one example, time interval $\Delta t$ is set to seven seconds.

Figure 6:
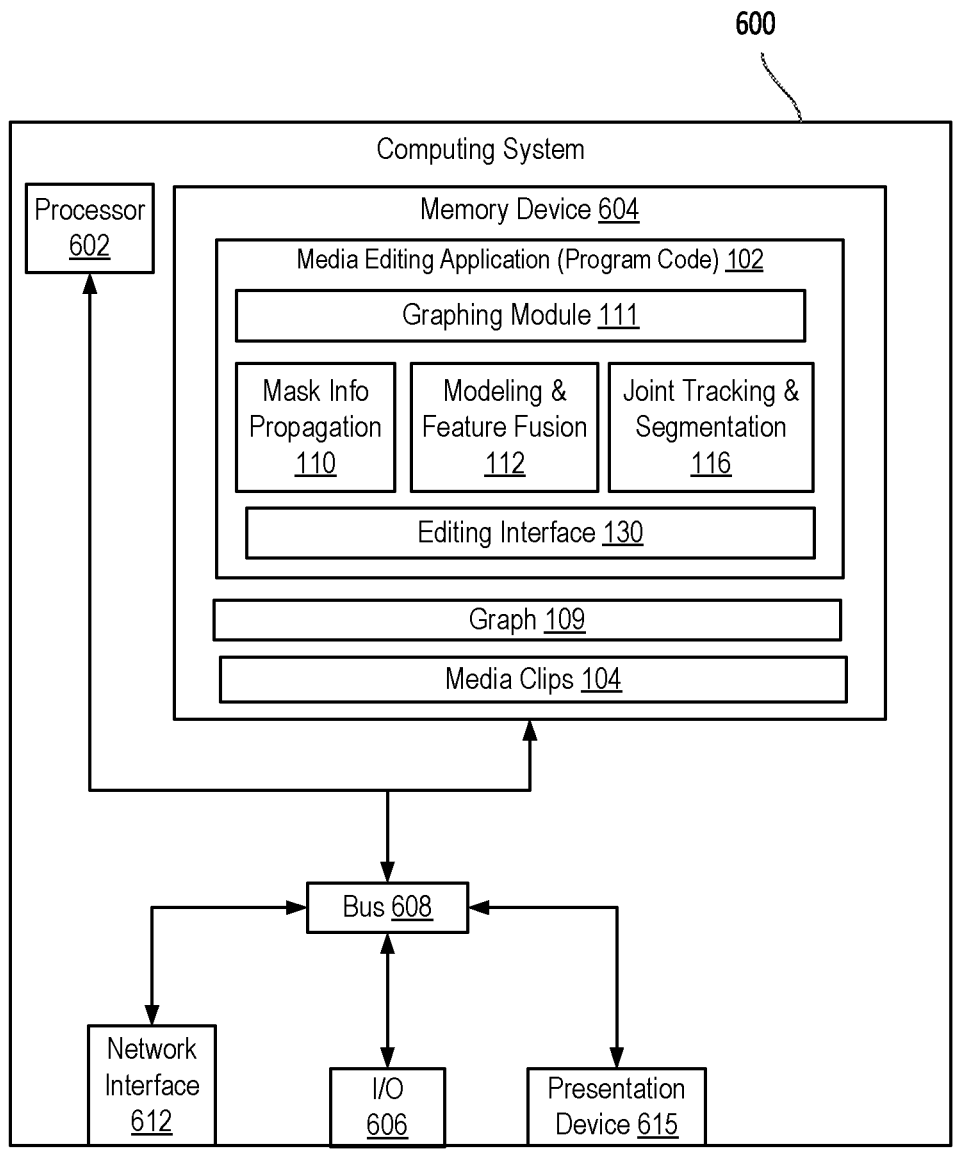
FIG. 6 is a diagram of an example of a computing system that can implement aspects of the graph-based video instance segmentation, according to certain embodiments.

FIG. 6 depicts a computing system 600 that executes the media editing application 102 with the capability of carrying out graph-based video instance segmentation according to embodiments described herein. System 600 includes a processor 602 communicatively coupled to one or more memory devices 604. The processor 602 executes computer-executable program code stored in the memory device 604. Examples of the processor 602 include a microprocessor, an application-specific integrated circuit ("ASIC"), a field-programmable gate array ("FPGA"), or any other suitable processing device. The processor 602 can include any number of processing devices, including a single processing device. The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 6, the computing system 600 may also include a number of external or internal devices, such as input or output devices. For example, the computing system 600 is shown with one or more input/output ("I/O") interfaces 606. An I/O interface 606 can receive input from input devices or provide output to output devices (not shown). One or more buses 608 are also included in the computing system 600. The bus 608 communicatively couples one or more components of a respective one of the computing system 600. The processor 602 executes program code that configures the computing system 600 to perform one or more of the operations described herein. The program code includes, for example, media editing application 102, or other suitable applications that perform one or more operations described herein. The program code may be resident in the memory device 604 or any suitable computer-readable medium and may be executed by the processor 602 or any other suitable processor. Memory device 604, during operation of the computing system, executable modules of the media editing application such as segmentation module 120, detection module 122, tracking module 124, and editing interface 130 and accesses the portions as needed. Memory device 604 is also used to temporarily store feature instance graphs 109 and media clips 104 or a portion thereof for the specific media segmentation job in progress.

The system 600 of FIG. 6 also includes a network interface device 612. The network interface device 612 includes any device or group of devices suitable for establishing a wired or wireless data connection to one or more data networks. Non-limiting examples of the network interface device 612 include an Ethernet network adapter, a wireless network adapter, and/or the like. The system 600 is able to communicate with one or more other computing devices (e.g., another computing device executing other software, not shown) via a data network (not shown) using the network interface device 612. Network interface device 612 can also be used to communicate with network or cloud storage used as a repository for stored media clips for use with the media editing application 102. Such network or cloud storage can also include updated or archived versions of the media editing application for distribution and installation.

Staying with FIG. 6, in some embodiments, the computing system 600 also includes the presentation device 615 depicted in FIG. 6. A presentation device 615 can include any device or group of devices suitable for providing visual, auditory, or other suitable sensory output. In examples, presentation device 615 displays media clips and video frames. Non-limiting examples of the presentation device 615 include a touchscreen, a monitor, a separate mobile computing device, etc. In some aspects, the presentation device 615 can include a remote client-computing device that communicates with the computing system 600 using one or more data networks. System 600 may be implemented as a unitary computing device such as a notebook or mobile computer. Alternatively, as an example, the various devices included in system 600 may be distributed and interconnected by interfaces or a network, with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more computing systems perform operations comprising:
   identifying, by a backbone neural network module, a reference instance of an object in a feature domain of a reference frame of a media clip including a plurality of consecutive video frames;
   identifying, by the backbone neural network module, features in a target frame of the media clip in the feature domain;
   producing, by a graphing module, a graph of nodes and edges based on the reference instance of the object in the reference frame and the features in the target frame, wherein each node of the graph represents a feature in the target frame or the reference instance of the object in the reference frame and each edge of the graph represents a spatiotemporal relationship between the feature in the target frame and the reference instance of the object in the reference frame;
   iteratively updating, by a modeling and graph feature fusion module, embeddings of the nodes and edges of the graph based on the spatiotemporal relationship to produce fused node embeddings and updated edge embeddings, wherein the embeddings of the nodes and edges are generated based on the reference instance of the features in the target frame;
   detecting, by a detection module, a target instance of the object in the target frame based on the fused node embeddings; and
   displaying, by a presentation device, the target instance of the object as visually segmented from the target frame.

2. The method of claim 1, wherein detecting the target instance of the object further comprises:
   segmenting the target instance of the object in the target frame of the media clip; and
   generating a segmentation mask for the detected target instance based on the fused node embeddings and historical mask information for frames preceding the target frame in the media clip.

3. The method of claim 2, wherein generating the segmentation mask further comprises warping the historical mask information to the target frame in the media clip.

4. The method of claim 1, wherein displaying the target instance of the object comprises displaying at least one of a segmentation mask or a bounding box for the target instance of the object.

5. The method of claim 1, further comprising selectively and repeatedly using the target frame and the target instance of the object to provide a subsequent reference frame for identifying the object in a subsequent target frame of the media clip.

6. The method of claim 1, further comprising:
pruning the edges based on the detected target instance by removing edges connecting features of the target frame outside the detected target instance and combining edges connecting features of the target frame inside the detected target instance; and
classifying the pruned edges based on the updated edge embeddings to determine an association between the detected target instance of the object in the target frame and the reference instance of the object in the reference frame.

7. The method of claim 1, further comprising training or retraining, using a cost function, one or more models used for detecting the target instance of the object.

8. A system comprising:
a processor; and
a memory device configured to store a media clip including a plurality of consecutive video frames and a graph of nodes and edges based on a reference instance of an object in the media clip, the memory device further storing a media editing application executable by the processor for performing operations comprising:
identifying the reference instance of the object in a reference frame of the media clip;
identifying features in a target frame of the media clip;
producing the graph of nodes and edges based on the reference instance of the object in the reference frame and the features in the target frame, wherein each node of the graph represents a feature in the target frame or the reference instance of the object in the reference frame and each edge of the graph represents a spatiotemporal relationship between the feature in the target frame and the reference instance of the object in the reference frame;
iteratively updating embeddings of the nodes and edges of the graph based on the spatiotemporal relationship to produce fused node embeddings and updated edge embeddings; and
detecting a target instance of the object in the target frame based on the fused node embeddings.

9. The system of claim 8, wherein the operation of detecting the target instance of the object further comprises:
segmenting the target instance of the object in the target frame of the media clip; and
generating a segmentation mask for the detected target instance based on the fused node embeddings and historical mask information for frames preceding the target frame in the media clip.

10. The system of claim 9, wherein the operation of generating the segmentation mask further comprises warping the historical mask information to the target frame in the media clip.

11. The system of claim 8, wherein the operation of displaying the target instance of the object comprises displaying at least one of a segmentation mask or a bounding box for the target instance of the object.

12. The system of claim 8, wherein the media editing application is further executable by the processor for performing an operation comprising selectively and repeatedly using the target frame and the target instance of the object to provide a subsequent reference frame for identifying the object in a subsequent target frame of the media clip.

13. The system of claim 8, wherein the media editing application is further executable by the processor for performing operations comprising:
pruning the edges based on the detected target instance by removing edges connecting features of the target frame outside the detected target instance and combining edges connecting features of the target frame inside the detected target instance; and
classifying the pruned edges based on the updated edge embeddings to determine an association between the detected target instance of the object in the target frame and the reference instance of the object in the reference frame.

14. The system of claim 8, wherein the media editing application is further executable by the processor for performing an operation comprising training or retraining, using a cost function, one or more models used for detecting the target instance of the object.

15. A non-transitory computer-readable medium storing program code executable by a processor to perform operations, the operations comprising:
identifying a reference instance of an object in a reference frame of a media clip including a plurality of consecutive video frames;
identifying features in a target frame of the media clip in the feature domain;
a step for producing a graph of nodes and edges based on the reference instance of the object in the reference frame and the features in the target frame;
a step for iteratively updating embeddings of the nodes and edges of the graph based on a spatiotemporal relationship between a feature in the target frame and the reference instance of the object in the reference frame to produce fused node embeddings and updated edge embeddings;
a step for identifying a target instance of the object in the target frame based on the fused node embeddings; and
displaying the target instance of the object as visually segmented from the target frame.

16. The non-transitory computer-readable medium of claim 15, wherein the step for identifying the target instance of the object further comprises warping the historical mask information to the target frame in the media clip.

17. The non-transitory computer-readable medium of claim 15, wherein the operation of displaying the target instance of the object further comprises displaying at least one of a segmentation mask or a bounding box for the target instance of the object.

18. The non-transitory computer-readable medium of claim 15, wherein the program code is further executable by the processor to perform an operation comprising selectively and repeatedly using the target frame and the target instance of the object to provide a subsequent reference frame for identifying the object in a subsequent target frame of the media clip.

19. The non-transitory computer-readable medium of claim 15, wherein the program code is further executable by the processor to perform operations comprising:
pruning the edges based on the identified target instance by removing edges connecting features of the target frame outside the identified target instance and combining edges connecting features of the target frame inside the identified target instance; and classifying the pruned edges based on the updated edge embeddings to determine an association between the identified target instance of the object in the target frame and the reference instance of the object in the reference frame.

20. The non-transitory computer-readable medium of claim 15, wherein the program code is further executable by the processor to perform an operation comprising training or retraining, using a cost function, one or more models used for detecting the target instance of the object.

* * * * *